United States Patent [19]
Katoh

[11] Patent Number: 6,038,739
[45] Date of Patent: Mar. 21, 2000

[54] TILT HINGE

[75] Inventor: Hideo Katoh, Kanagawa, Japan

[73] Assignee: Katoh Electrical Machinery Co., Ltd., Kanagawa, Japan

[21] Appl. No.: 08/905,598

[22] Filed: Aug. 4, 1997

[30] Foreign Application Priority Data

May 8, 1996 [JP] Japan ................................ 8-206272

[51] Int. Cl.[7] .............................................. E05D 11/10
[52] U.S. Cl. ............................... 16/342; 16/329; 16/331; 16/332; 16/334
[58] Field of Search .......................... 16/302, 303, 304, 16/329, 331, 332, 334, 339, 366, 368, 369, 371, 374, 376, 340, 342

[56] References Cited

U.S. PATENT DOCUMENTS

| | | | |
|---|---|---|---|
| 4,829,633 | 5/1989 | Kassner | 16/332 |
| 5,109,570 | 5/1992 | Okada et al. | 16/376 |
| 5,208,944 | 5/1993 | Lu | 16/340 |
| 5,269,047 | 12/1993 | Lu | 16/340 |
| 5,702,197 | 12/1997 | Chen | 16/342 |

*Primary Examiner*—Anthony Knight
*Assistant Examiner*—Patrick Szymkowicz

*Attorney, Agent, or Firm*—Notaro & Michalaos P.C.

[57] ABSTRACT

To provide a tilt hinge capable of obtaining a great frictional torque despite of its small size and insuring a clip stop, the present invention comprises a bracket to be mounted on the body side of the equipment, a rotating shaft designed to be mounted to the end of an opening-closing body which is rotatably mounted on a bearing section of the bracket, a friction washer mounted between the large-diameter portion of the rotating shaft and the bearing section and/or on the other side face of the bearing section with the rotating shaft inserted into the central part, and an elastic means mounted with the rotating shaft inserted in the central part to press the friction washer against the large-diameter portion and/or the bearing section; and a click stop means is provided between the rotating shaft and the bracket. In this case, the elastic means may be a plurality of disk springs or spring washers; and the click stop means may be comprised of a cam plate rotating together with the rotating shaft, a ball provided on the bracket side, in contact with the cam plate, and an elastic means to press the ball against the cam plate side, or may be comprised of a cam plate having elasticity and rotating with the rotating shaft, and provided with a single or a plurality of recesses, small holes or cutouts, and a ball fixed on the bracket side, in contact with the cam plate, and intermittently entering the recess, small hole or cutout.

12 Claims, 8 Drawing Sheets

TILT HINGE

BACKGROUND OF THE INVENTION

1. Field of the Invention

The present invention relates to a tilt hinge suitable for use for opening and closing a part constituting various kinds of electronic equipment such as television sets, office automation equipment, etc.

2. Description of the Related Art

In a heretofore known tilt hinge of this type, as opening-closing part is mounted on a rotating shaft consisting of a single shaft which is rotatably supported on a bracket mounted on the body of the equipment. The rotation of this rotating shaft is controlled by a friction mechanism designed to work on the rotating shaft.

The conventional tilt hinge having the single rotating shaft has the advantage that it can be manufactured at a low cost because of a simple construction. This tilt hinge, however, has such a drawback that when a greater friction is needed, it is inevitable to use a larger-sized equipment in order to provide a large frictional surface area. This is true also when simultaneously obtaining both a click stop function and a greater frictional function.

SUMMARY OF THE INVENTION

It is an object of the present invention to provide a tilt hinge capable obtaining a greater frictional torque despite of its small size than a heretofore known single-shaft tilt hinge, and also ensuring click stopping.

To accomplish the aforementioned object, the present invention comprises a bracket to be mounted on the body side of the equipment, a rotating shaft designed to be mounted to the end portion of an opening-closing body which is rotatably mounted on a bearing section of the bracket, a friction washer mounted between the large-diameter portion of the rotating shaft and the bearing section and/or in contact with the other side face of the bearing section with the rotating shaft inserted into the central part, and an elastic means mounted with the rotating shaft inserted in the central part to press the friction washer against the large-diameter portion and/or the bearing section; and a click stop means is provided between the rotating shaft and the bracket.

According to the present invention, the click stop means at this time, may be comprised of a cam plate which rotates together with the rotating shaft, a ball inserted on the bracket side to contact the cam plate, and an elastic means for pressing the ball against the cam plate.

Furthermore, the click stop means may be comprised of a cam plate having elasticity, provided with a single or a plurality of recesses, small holes or cutouts, and rotating together with the rotating shaft, and balls which contact the cam plate and are fixed on the bracket side so as to be intermittently fitted in the recesses, small holes or cutouts.

The present invention may also be comprised of a bracket to be mounted on the body side of the equipment; a rotating shaft designed to be rotatably mounted to the bearing section of the bracket; a cam plate interposed between the large-diameter portion of the rotating shaft and one side face of the bearing section, with the rotating shaft inserted in the central part, so as to rotate together with the rotating shaft; a first friction washer interposed between the cam plate and the bearing section, with the rotating shaft inserted into the central part, so as to rotate together with the cam plate; a non-rotating section friction washer mounted on the outer side of the bearing section, with the rotating shaft inserted in the central part, and locked on the bracket; a plurality of disk springs mounted in contact with the second friction washer, with the rotating shaft inserted in the central part; a nut mounted on one end of the rotating shaft to press the disk spring toward the bearing section side; a retaining washer interposed between the nut and the disk spring, with the rotating shaft inserted in the central part, so as to rotate together with the rotating shaft; a ball mounted on the bracket side to contact the cam plate; and a plate spring for pressing the ball against the cam plate.

The present invention may also be comprised of a bracket to be mounted on the body side of the equipment; a rotating shaft designed to be rotatably mounted to the bearing section of the bracket; a cam plate interposed between the large-diameter portion of the rotating shaft and one side face of the bearing section, with the rotating shaft inserted in the central part, so as to rotate together with the rotating shaft; a first friction washer interposed between the cam plate and the bearing section, with the rotating shaft inserted into the central part, so as to rotate together with the cam plate; a non-rotating section friction washer mounted on the other side of the bearing section, with the rotating shaft inserted in the central part, and locked on the bracket; a plurality of disk springs mounted on contact with the section friction washer, with the rotating shaft inserted in the central part so as to rotate together with the rotating shaft; a nut mounted on one end of the rotating shaft to press the disk spring toward the bearing section side; a retaining washer interposed between the nut and the disk spring, with the rotating shaft inserted in the central part, so as to rotate together with the rotating shaft; a ball mounted on the bracket side to contact the cam plate; and a plate spring for pressing the ball against the cam plate side.

The present invention may also be comprised of a bracket to be mounted on the body side of the equipment; a rotating shaft designed to be rotatably mounted to the bearing section of the bracket; a cam plate interposed between the large-diameter portion of the rotating shaft and one side face of the bearing section, with the rotating shaft inserted in the central part, so as to rotate together with the rotating shaft; a first friction washer interposed between the cam plate and the bearing section, with the rotating shaft inserted into the central part, so as to rotate together with the cam plate; a second friction washer mounted in contact with the other side of the bearing section, with the rotating shaft inserted in the central part, so as to rotate with the rotating shaft; a plurality of disk springs mounted in contact with the second friction washer, with the rotating shaft inserted in the central part; a retaining washer mounted in contact with the disk springs with the rotating shaft inserted in the central part; a staked portion of the rotating shaft staked to the retaining washer to the disk spring side; a ball provided on the bracket side, contacting the cam plate; and a plate spring for pressing the ball against the cam plate side.

Furthermore, in the present invention it is possible to provide a grease reservoir by forming a small hole, a recess, or a cutout in the surface of the each friction washer.

According to the present invention, it is possible to use them by arranging each two adjacent pieces of the plurality of disk springs face to face, or by setting the disk springs all in the same direction, or by laminating some pieces of the disk springs in one direction and other pieces in the other direction.

The above and other objects, features and advantages of the present invention will become more apparent from the following description with reference to the accompanying drawings.

DESCRIPTION OF THE PREFERRED EMBODIMENTS

Figure 1:
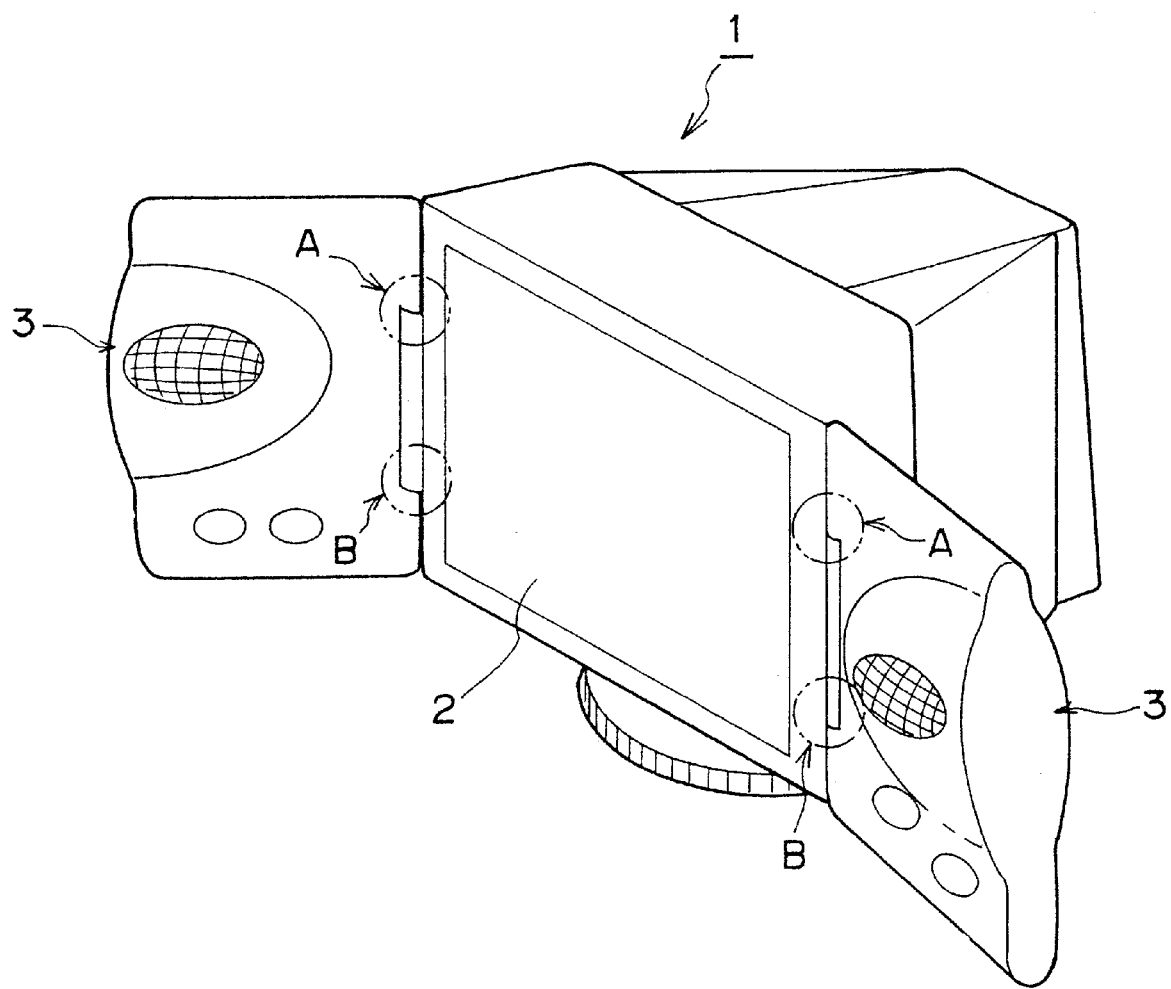
FIG. 1 is a perspective view of a video entertainment system using a tilt hinge of the present invention.
Figure 2:
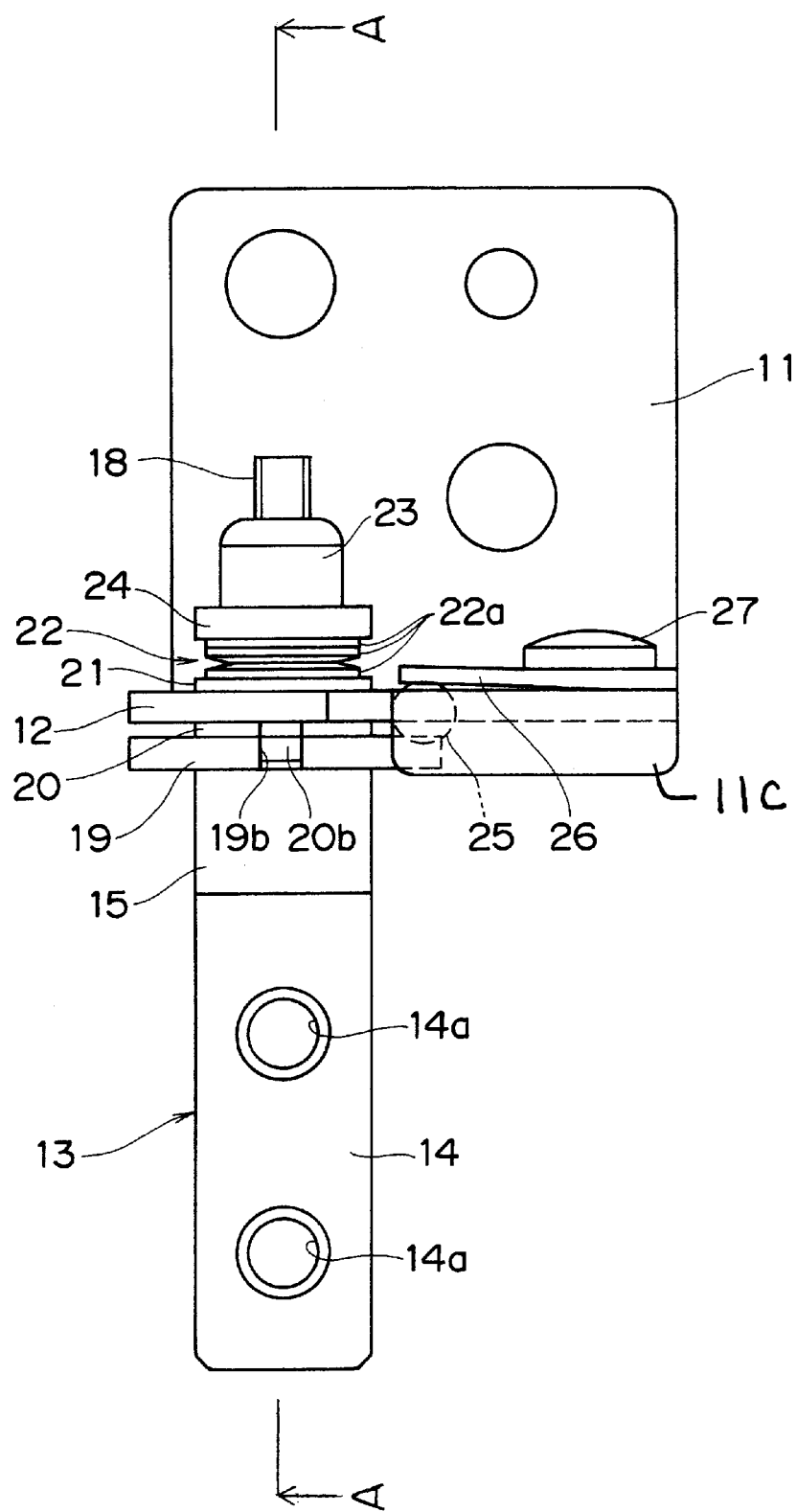
FIG. 2 is a front view of the tilt hinge of the present invention.
Figure 3:
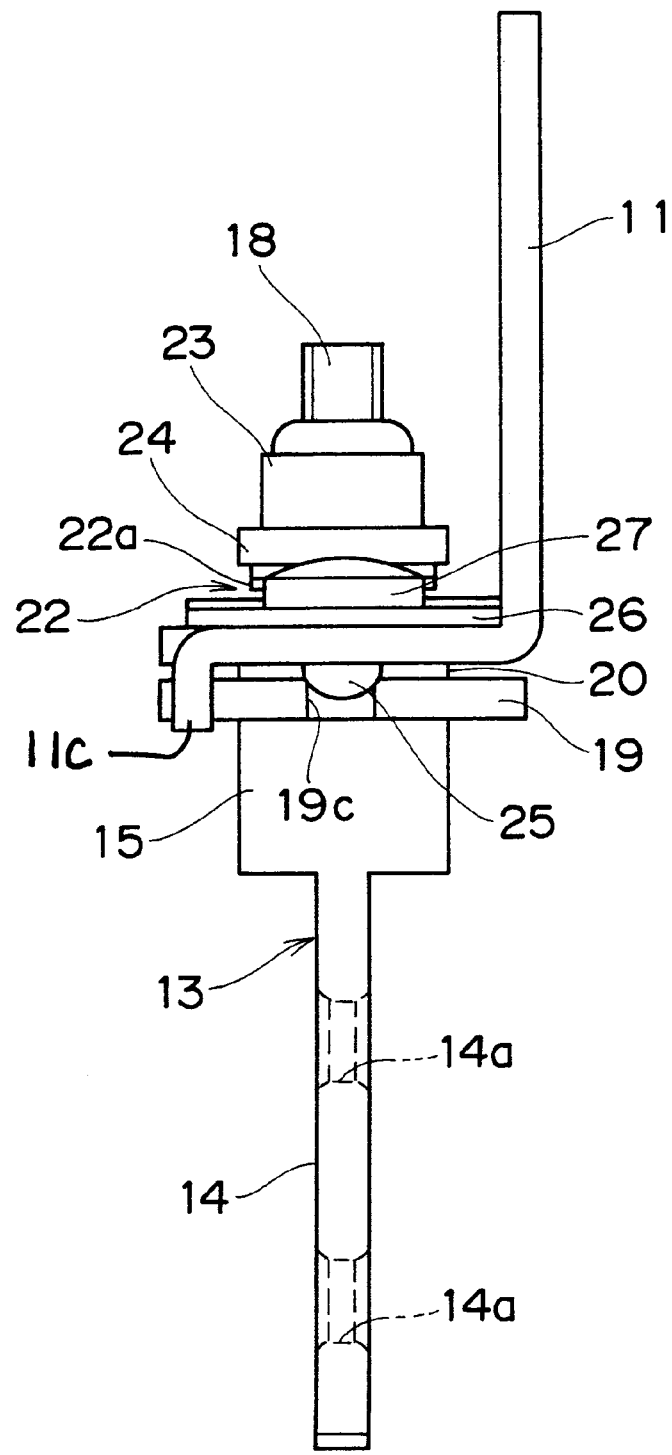
FIG. 3 is a side view of the tilt hinge shown in FIG. 1.
Figure 4:
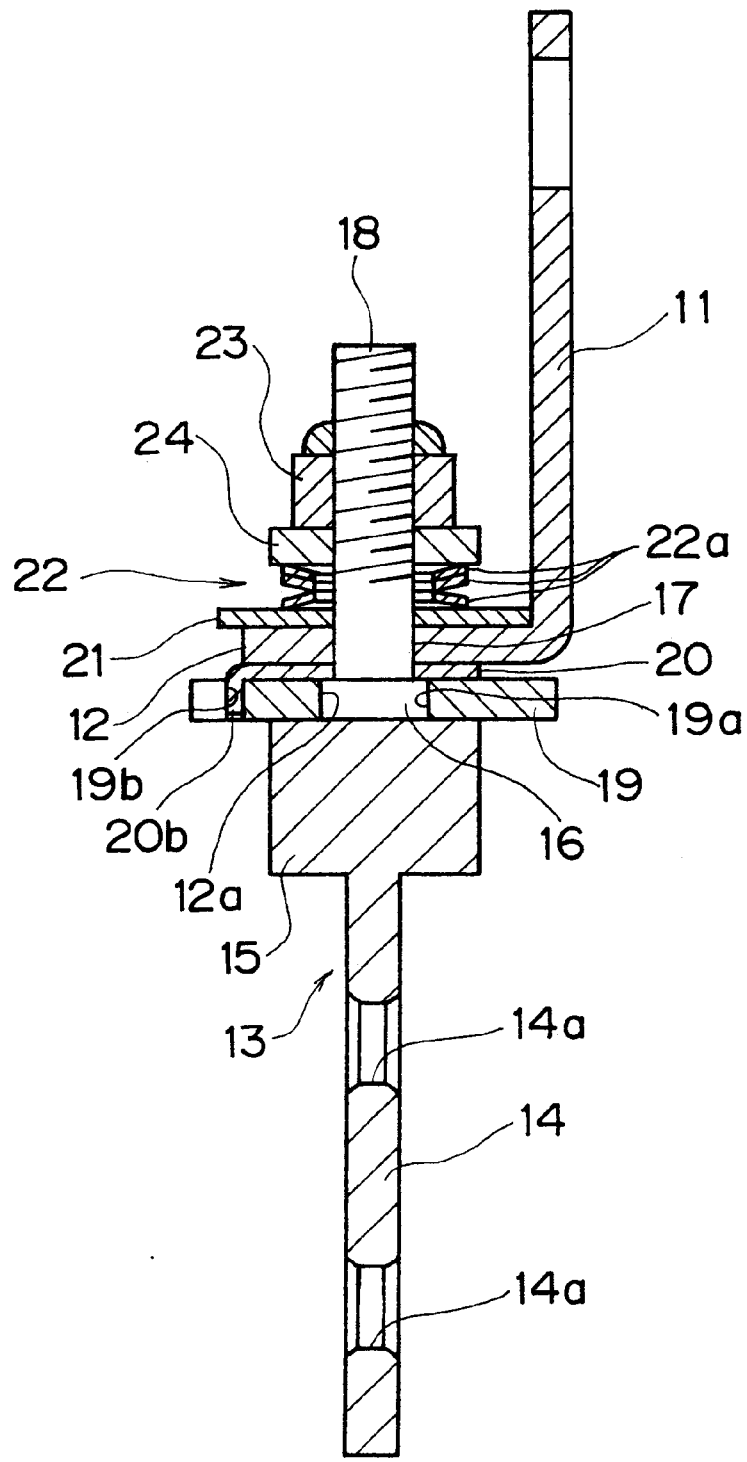
FIG. 4 is a sectional view taken along line A—A of FIG. 2.
Figure 5:
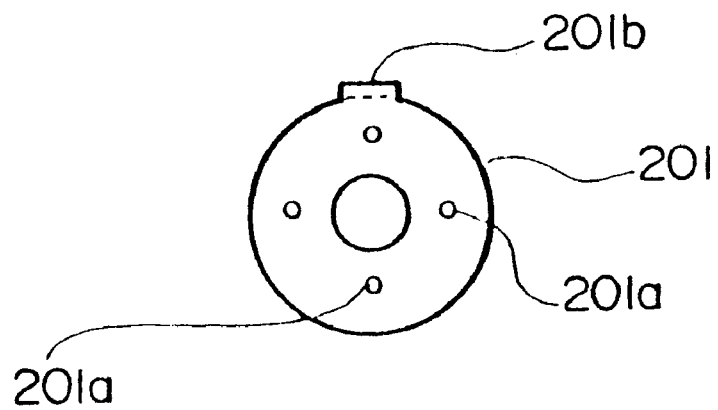
FIGS. 5 (a) and (b) are front views showing another embodiment of a friction washer.
Figure 5:
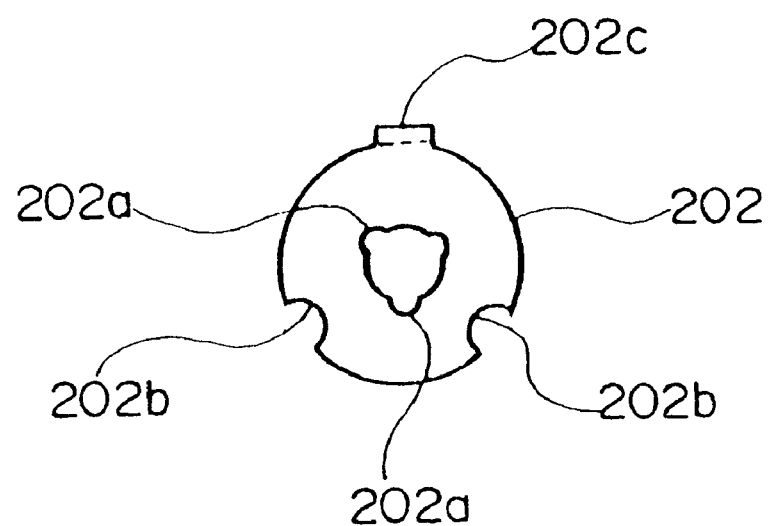
Figure 6:
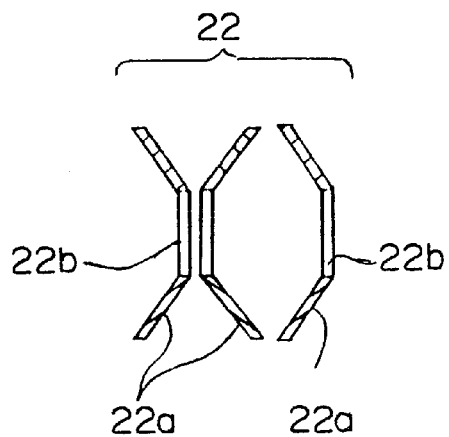
FIGS. 6(a), (b) and (c) are explanatory views explaining the way of assembling a plurality of spring washers.
Figure 6:
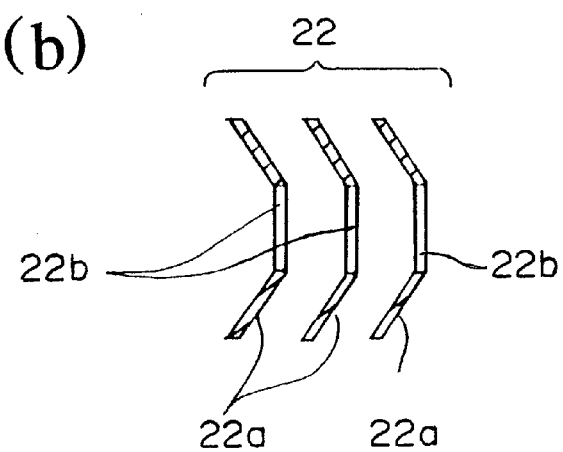
Figure 6:
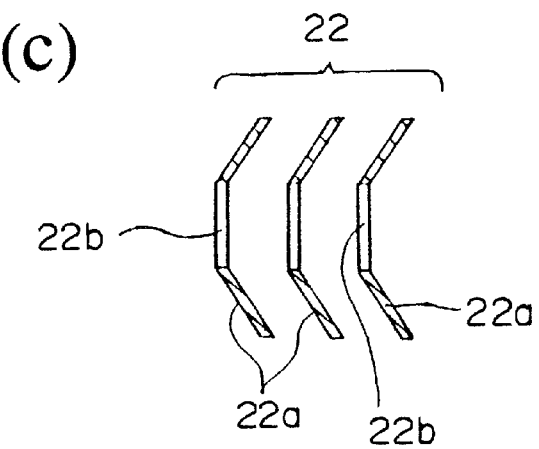
Figure 7:
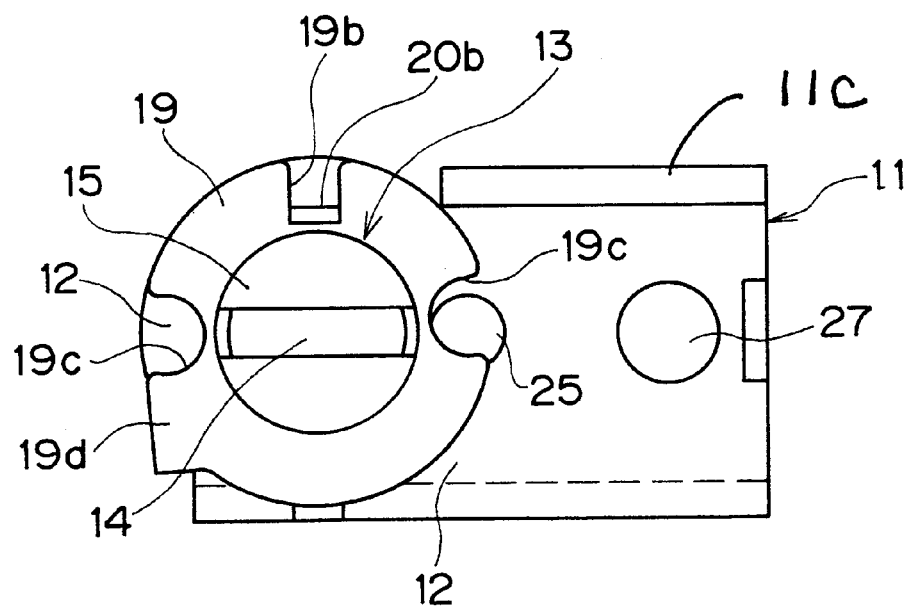
FIG. 7 is a plan view of the tilt hinge shown in FIG. 1.
Figure 8:
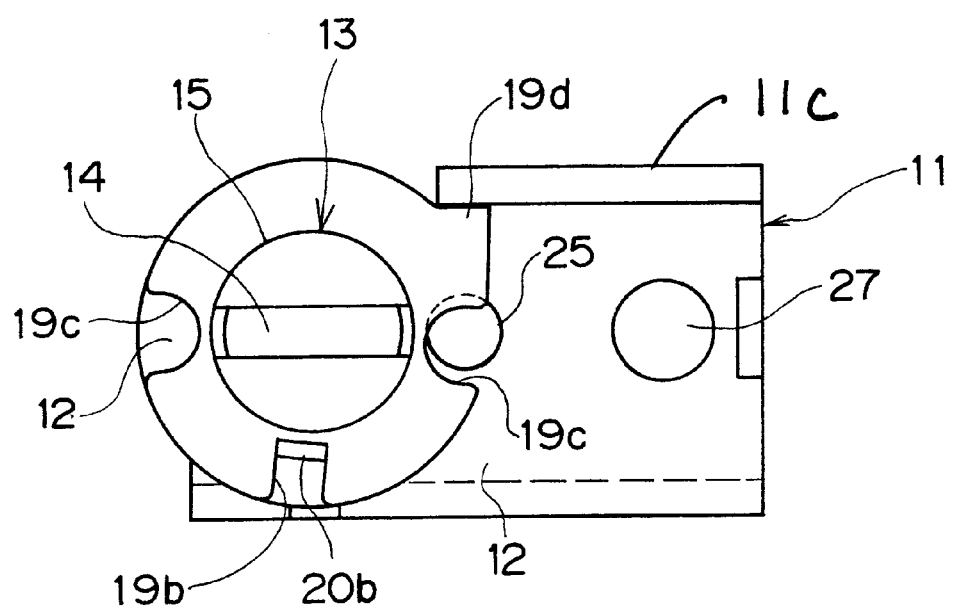
FIG. 8 is a plan view of a rotating shaft rotated 180 degrees.
Figure 9:
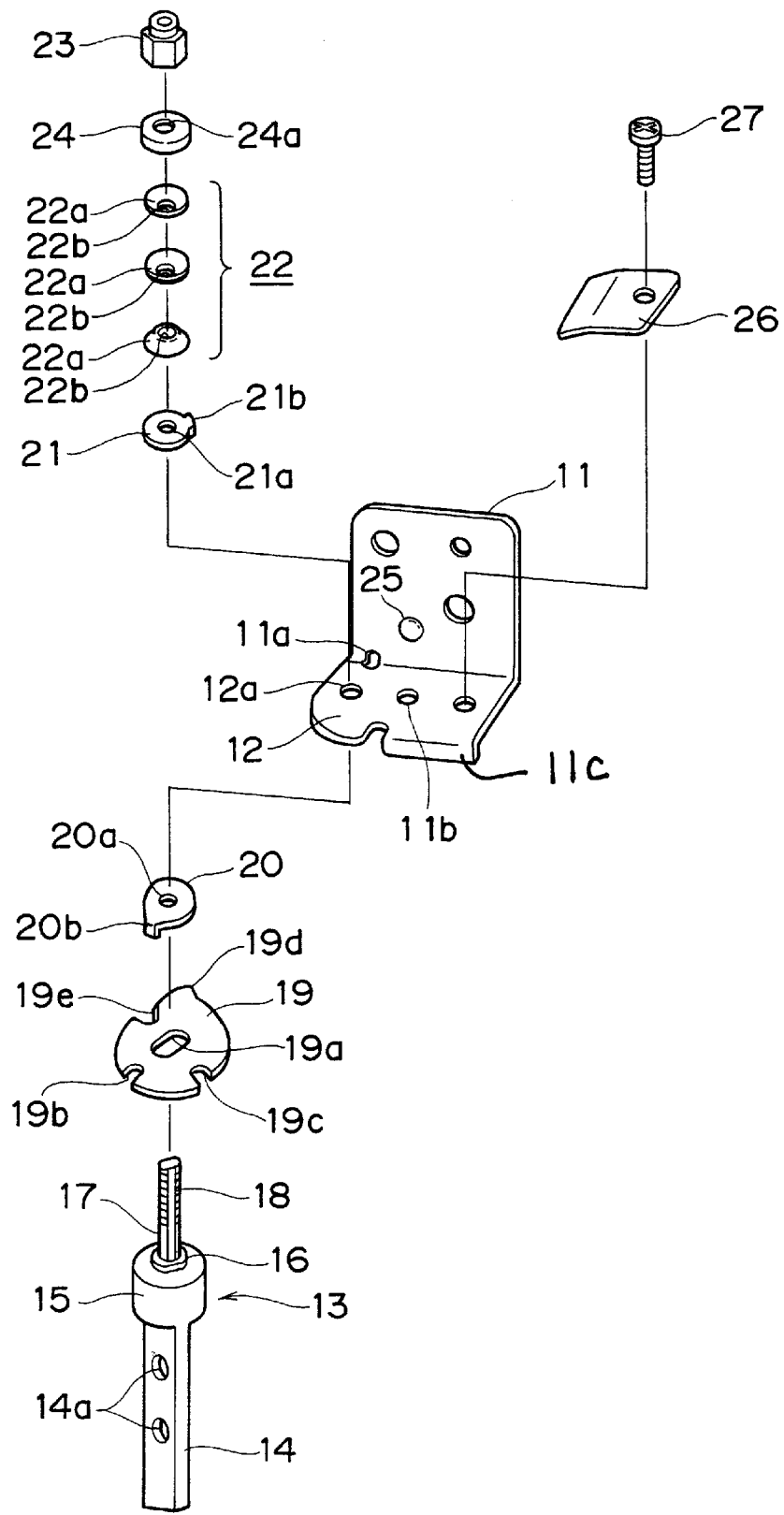
FIG. 9 is an exploded perspective view of the tilt hinge shown in FIG. 2.

FIG. 1 shows a video entertainment system using a tilt hinge of the present invention, in which opening-closing bodies 3, 3 including a pair of door-shaped speakers are openably attached on both sides of a cathode-ray tube 2 of a body 1 of the video entertainment system; and tilt hinges are used in four positioned in all when viewed in the directions A and B in FIG. 1. This is only one example of application and accordingly the tilt hinge of the present invention is applicable also to other types of opening-closing bodies, for instance display bodies of laptop office automation equipment.

FIGS. 2 to 9 show details of the tilt hinge. Reference numeral 11 denotes a bracket to be attached on the body 1 side of an equipment such as the above-described small-type office automation equipment, video entertainment system, etc.; a bearing section 12 is formed by providing a bearing hole 12a with one side of the bracket bent to protrude in one direction to form a stopper piece 11C. Numeral 13 is a rotating shaft mounted in one end of the opening-closing body 3 to openably support the opening-closing body 3. The rotating shaft 13 includes a mounted portion 14 provided with mounting holes 14a, 14a formed by cutting out both sides; a large-diameter portion 15 having a round sectional form; an irregular-shape medium-diameter portion 16 formed by cutting both sides; an irregular-shape small-diameter portion 17 formed by cutting body sides; and an external thread portion 18 provided on the irregular-shape small-diameter portion 17. The external thread portion 18 may be smaller in diameter than the irregular-shape small-diameter portion 17 and have a round sectional form. The rotating shaft 13 is generally small in diameter: 6 to 8 mm in diameter in the large-diameter portion and 3 to 4 mm in diameter in the small-diameter portion.

Between the large-diameter portion 15 and one side face of the bearing section 12 is mounted a cam plate 19 rotating together with the rotating shaft 13 with the irregular-shape medium-diameter portion 16 of the rotating shaft 13 inserted in and engaged with an irregular-shape hole 19a provided in the central part thereof. The cam plate 19 is provided with a locking output 19b in the outer edge, engaging outputs 19c, 19c, and a stopper section 19d. Between the cam plate 19 and one side face of the bearing section 12 is interposed a first friction washer 20 which is produced of a tough and abrasion-resisting material such as phosphor bronze. With the irregular-shape small-diameter portion 17 inserted in an insertion hole 20a provided in the central part thereof, a lock piece 20b provided on the outer periphery is engaged with the locking cutout 19b made in the cam plate 19. The first friction washer 20, as shown in FIGS. 5(a) and (b), may be used as a first friction washer 201 having a lock piece 201b provided with a small hole 201a in the surface which serves as a grease reservoir or as a first friction washer 202 having a lock piece 202c provided with cutouts 202a and 202b.

There is provided a second friction washer 21 produced of a tough and abrasion-resisting material, such as phosphor bronze, in contact with the other side face of the bearing section 12, with the irregular-shape small-diameter portion 17 inserted in the insertion hole 21a provided at the central part thereof. The second friction washer 21 is non-rotatably locked by bending the lock piece 21b provided on the outer periphery, to the locking hole 11a provided in the bracket 11. The second friction washer 20, as shown in FIGS. 5(a) and (b), also may be provided with a grease reservoir as in the first friction washer 21. An elastic means 22 comprising a plurality (three in the present embodiment) of disk springs 22a is mounted in contact with the second friction washer 21, with the irregular-shape small-diameter portion 17 inserted in an insertion hole 22b provided in the central part. One piece and a set of two pieces of disk springs 22a are arranged in a predetermined direction or directions respectively; and the projecting part side of these pieces arranged in one direction faces to those of other pieces set in the other direction. It should be noted that the elastic means may be other than the disk springs, for instance spring washers.

It should be noticed that the way of use of the plurality of disk springs 22 constituting the elastic means 22 is not limited to that of the present embodiment, and may be used as shown in FIGS. 6(a), (b) and (c). That is, in FIG. 6(a), the disk springs 22 are arranged alternately in oppositely directions. In either of FIGS. 6(b) and (c) the disk springs 22 are arranged all in the same direction; and only the direction of setting differs between (b) and (c). Furthermore, others than the quantity, size and way of assembling of these disk springs 22 of the above-described embodiment are possible, and may be changed according to a torque required.

On the external thread portion 18 is fitted a lock nut 23 (produced of a synthetic resin, e.g., nylon, in the present embodiment) through threads, and between the lock nut 23 and the elastic means 22 is installed a retaining washer 24 rotating together with the rotating shaft 13 with the irregular-shape small-diameter portion 17 inserted in the irregular-shape insertion hole 24a provided in the central part. An unillustrated staked portion is provided by dispensing with the external thread portion 18 and the nut 23 and by staking the retaining washer 24 side of the rotating shaft 13, and the retaining washer 24 may be pushed by this staked portion toward the elastic means side. A ball insertion hole 11b is provided through bracket 11, in which a ball 25 is inserted. Ball 25 contacts one face of the cam plate 19. An elastic means 26 comprising a plate spring for pressing the ball 25 against the cam plate 19 side is mounted by a screw 27 on bracket 11.

Therefore, when the rotating shaft 13 is rotating, a frictional torque is produced between the first friction washer 20 and the bearing section 12, between the second friction washer 21 and the disk spring 22a, and between the cam plate 19 and the ball 25, whereby holding the opening-closing body 3 stable in a free stop position. When the opening-closing body 3 is closed, the ball 25 rolls and down into one of the engaging cutouts 19c of the cam plate 19, thereby producing a so-called suction phenomenon by which the opening-closing body 3 is closed as if sucked in; that is, the opening-closing body 3 is closed by engagement of the ball 25 with the engaging cutout 19*c*.

Next, when the opening-closing body 3 is opened 180 degrees, the ball 25 drops in the other engaging cutout 19*c*, in which position the opening-closing body 3 clicks to stop to be held stable. At the same time, the stopper section 19*d* is engaged with the stopper piece 11*c* of bearing section 11. In this case, the position and quantity of the engaging cutouts 19*c* are not limited to those of the present embodiment. For the elastic means 26, an elastic means produced of a compression spring, rubber, synthetic resin, etc. may be used, and furthermore the ball itself may be changed to an elastic part and also the cam plate itself may be changed to an elastic part.

A lubricating grease now shown has been applied between the first friction washers 20, 201 and 202 and the bearing section 12 and between the second friction washer 21 and the disk spring 22*a* where the frictional torque is produced.

To which member the first and second friction washers are secured and between which members the frictional torque is produced are not limited to the embodiment described above. For example, the first and second friction washers can be so designed as to rotate together with the rotating shaft, to thereby produce the frictional torque on both sides of the bearing section. In this case, in both the first and second friction washers are formed the irregular-shape shaft holes, so that the irregular-shape small-diameter portion of the rotating shaft may be inserted into the irregular-shaped shaft holes. Furthermore the first friction washer may be provided with a projecting lock piece to locking to the large-diameter portion, while the second friction washer may be designed to engage the irregular-shape small-diameter portion with the irregular-shaped shaft hole. Furthermore, the material of each friction washer is not limited to phosphor bronze and may be other kinds of metals, such as iron plate, stainless steel plate, etc., or a synthetic resin plate having a mechanical strength.

What is claimed is:

1. A tilt hinge comprising:
   a bracket for mounting on the side of a body of an equipment and having a bearing section;
   a rotating shaft adapted for installing to an end of an opening and closing member rotatably mounted to the bearing section of said bracket;
   a cam plate having elasticity, the cam plate provided with at least one recess and an irregular-shaped hole through the cam plate, the cam plate interposed between a large-diameter portion of the rotating shaft and one side face of the bearing section, the rotating shaft inserted through the irregular-shaped hole for rotating the cam plate with the rotating shaft;
   a first friction washer interposed between the cam plate and the bearing section and having an insertion hole through which the rotating shaft is inserted, the first friction washer rotating with the cam plate;
   a non-rotating section friction washer mounted on the other, second side of the bearing section, the rotating shaft being inserted therethrough and locked to said bracket;
   a plurality of disk springs mounted on the rotating shaft in contact with the second friction washer;
   a nut connected to one end of the rotating shaft for pressing the plurality of disk springs toward the second side of the bearing section;
   a retaining washer having a second irregular-shaped hole therethrough, the retaining washer interposed between the nut and the plurality of disk springs with the rotating shaft inserted through the second irregular-shaped hole, the retaining washer rotatable with the rotating shaft;
   a ball mounted on the bearing section of the bracket oriented capable of contacting the at least one recess in the cam plate; and
   a plate spring for pressing the ball against the cam plate.

2. A tilt hinge according to claim 1, wherein the cam plate further comprises a stopper section for contacting a stopper piece of the bearing section.

3. A tilt hinge according to claim 2, further comprising a grease reservoir formed in the friction washer by one of a small hole and a cutout provided in the surface thereof.

4. A tilt hinge according to claim 2, wherein the plurality of disk springs are oriented one of face-to-face and all in the same direction.

5. A tilt hinge according to claim 1, further comprising a grease reservoir formed in the friction washer by one of a small hole and a cutout provided in the surface thereof.

6. A tilt hinge according to claim 1, wherein the plurality of disk springs are oriented one of face-to-face and all in the same direction.

7. A tilt hinge comprising:
   a bracket for mounting one the side of a body of an equipment and having a bearing section;
   a rotating shaft adapted for installing to an end of an opening and closing member rotatably mounted to the bearing section of said bracket;
   a cam plate having elasticity, the cam plate provided with at least one recess and an irregular-shaped hole through the cam plate, the cam plate interposed between a large-diameter portion of the rotating shaft and one side face of the bearing section, the rotating shaft inserted through the irregular-shaped hole for rotating the cam plate with the rotating shaft;
   a first friction washer interposed between the cam plate and the bearing section and having an insertion hole through which the rotating shaft is inserted, the first friction washer rotating with the cam plate;
   a non-rotating second friction washer mounted on the other, second side of the bearing section, the rotating shaft being inserted therethrough and locked to said bracket;
   a plurality of disk springs mounted on the rotating shaft in contact with the second friction washer;
   a nut connected to one end of the rotating shaft for pressing the plurality of disk springs toward the second side of the bearing section;
   a retaining washer having a second irregular-shaped hole therethrough, the retaining washer interposed between the nut and the plurality of disk springs with the rotating shaft inserted through the second irregular-shaped hole, the retaining washer rotatable with the rotating shaft;
   a ball movably mounted in a through hole of the bearing section of the bracket oriented capable of contacting the at least one recess in the cam plate; and
   a plate spring for pressing the ball against the cam plate.

8. A tilt hinge according to claim 7, further comprising a grease reservoir formed in the friction washer by one of a small hole and a cutout provided in the surface thereof.

9. A tilt hinge according to claim 7, wherein the plurality of disk springs are oriented one of face-to-face and all in the same direction.

10. A tilt hinge comprising:

a bracket for mounting on the side of a body of an equipment and having a bearing section;

a rotating shaft adapted for installing to an end of an opening and closing member rotatably mounted to the bearing section of said bracket;

a cam plate having elasticity, the cam plate provided with at least one recess and an irregular-shaped hole through the cam plate, the cam plate interposed between a large-diameter portion of the rotating shaft and one side face of the bearing section, the rotating shaft inserted through the irregular-shaped hole for rotating the cam plate with the rotating shaft;

a first friction washer interposed between the cam plate and the bearing section and having an insertion hole through which the rotating shaft is inserted, the first friction washer rotating with the cam plate;

a non-rotating section friction washer mounted on the other, second side of the bearing section, the rotating shaft being inserted therethrough and locked to said bracket;

a plurality of disk springs mounted on the rotating shaft in contact with the second friction washer;

a retaining washer having a second irregular-shaped hole therethrough, the retaining washer mounted in contact with the plurality of disk springs with the rotating shaft inserted through the second irregular-shaped hole, the retaining washer rotatable with the rotating shaft;

a staked portion on the rotating shaft, the staked portion staking the retaining washer to the plurality of disk springs;

a ball movably mounted in a through hole of the bearing section of the bracket oriented capable of contacting the at least one recess in the cam plate; and a plate spring for pressing the ball against the cam plate.

11. A tilt hinge according to claim 10, further comprising a grease reservoir formed in the friction washer by one of a small hole and a cutout provided in the surface thereof.

12. A tilt hinge according to claim 10, wherein the plurality of disk springs are oriented one of face-to-face and all in the same direction.

* * * * *